United States Patent
Dostert et al.

(10) Patent No.: US 7,161,985 B2
(45) Date of Patent: Jan. 9, 2007

(54) METHOD AND DEVICE FOR TRANSMITTING DATA ON AT LEAST ONE ELECTRICAL POWER SUPPLY LINE

(75) Inventors: Klaus Dostert, Krickenbach (DE); Norbert Elsner, Bubenreuth (DE); Gerd Griepentrog, Gutenstetten (DE); Reinhard Maier, Herzogenaurach (DE); Wilfried Matthee, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 768 days.

(21) Appl. No.: 10/451,106

(22) PCT Filed: Dec. 6, 2001

(86) PCT No.: PCT/DE01/04583

§ 371 (c)(1),
(2), (4) Date: Jun. 19, 2003

(87) PCT Pub. No.: WO02/51089

PCT Pub. Date: Jun. 27, 2002

(65) Prior Publication Data

US 2004/0047427 A1    Mar. 11, 2004

(30) Foreign Application Priority Data

Dec. 20, 2000 (DE) .................... 100 63 675

(51) Int. Cl.
*H04L 25/00* (2006.01)
(52) U.S. Cl. .......... 375/257; 375/285; 375/340; 370/203; 370/204; 370/208; 340/310.02

(58) Field of Classification Search ........ 375/257, 375/260, 267, 285, 296, 346; 455/296, 307, 455/101, 103, 104; 370/203, 204, 208, 343; 340/310.01–310.02
See application file for complete search history.

(56) References Cited

U.S. PATENT DOCUMENTS

| | | | |
|---|---|---|---|
| 4,845,466 A | | 7/1989 | Hariton et al. |
| 6,522,626 B1 | * | 2/2003 | Greenwood .......... 370/208 |
| 6,680,979 B1 | * | 1/2004 | Kato et al. .......... 375/260 |

FOREIGN PATENT DOCUMENTS

| | | |
|---|---|---|
| DE | 40 08 023 A1 | 9/1991 |
| DE | 199 00 324 C1 | 7/2000 |
| EP | 1 018 826 A2 | 7/2000 |
| WO | WO 98/57440 | 12/1998 |

* cited by examiner

*Primary Examiner*—Dac V. Ha
(74) *Attorney, Agent, or Firm*—Morrison & Foerster LLP

(57) ABSTRACT

The orthogonal frequency division multiplexing (OFDM) method is well-known for transmitting data on electrical power supply lines. According to this method, the items of information to be transmitted are distributed among numerous carriers, and the composite signal of the modulated carrier signals is transmitted in the form of an OFDM block. Standard OFDM methods are, however, highly sensitive to strong periodic pulse jammers. According to the invention, the method is thus devised such that the OFDM blocks to be transmitted have a length of approximately 85% of the interval between two periodic disturbing pulses. The carrier interval accordingly results from the reciprocal duration of the OFDM blocks. The transmitted OFDM blocks are synchronized with pulse-shaped periodic jammers in such a manner that one block at a time is located between two disturbing pulses. The pulse-shaped jammers can be gated at the receiver. To this end, the inventive device comprises an appropriately designed transmitter (20) and an associated receiver (30).

16 Claims, 2 Drawing Sheets

METHOD AND DEVICE FOR TRANSMITTING DATA ON AT LEAST ONE ELECTRICAL POWER SUPPLY LINE

CLAIM FOR PRIORITY

This application claims priority to International Application No. PCT/DE01/04583, which was published in the German language on Jun. 27, 2002, which claims the benefit of priority to German Application No. 10063675.6 which was filed in the German language on Dec. 20, 2000.

TECHNICAL FIELD OF THE INVENTION

The present invention relates to a method for transmitting data on at least one electrical power supply line, on which pulse-shaped interference signals occur periodically due to commutation processes, e.g. in rectifiers, with intermediate, almost interference-free time intervals, using the OFDM method in which the information to be transmitted is distributed over a number of carriers and the composite signal of all modulated carriers is transmitted in the form of a burst. The present invention also relates to the associated device for carrying out the method.

BACKGROUND OF THE INVENTION

It is known to transmit data on electrical power lines. Such a type of data transmission is of particular use especially in traffic engineering in order to implement, e.g. train control or signalling.

In the prior art, broad-band transmission methods are used for transmitting data on electrical power lines. The favorite method is generally the OFDM (orthogonal frequency division multiplex) method which distributes the information to be transmitted over a very large number of mutually orthogonal carriers and transmits the composite signal of all modulated carriers in the form of a so-called OFDM burst. Accordingly, filters used for suppressing noise must have a band pass characteristic and the width of the band pass corresponds to at least the necessary band width of the composite OFDM signal. From EP 1 018 826 A2, in particular, multicarrier transmission on power systems by using an OFDM method is known in which the signal obtained by an inverse Fourier transform and corresponding to a single data burst is transmitted for a predetermined time duration (OFDM burst duration) to a receiver, these bursts following one another as closed, i.e. temporarily contiguous signal bursts. It is proposed to multiply each signal by a window function or to use a specific digital filter for the purpose of spectral limitation before the transmission.

Furthermore, in U.S. Pat. No. 4,845,466A, a system for digital high-speed information transmission in environments containing interference signals is described and a specific solution is described especially for alternating-current transmission lines, in which first the zero transition of the alternating voltage is determined by means of a sign detector and signal patterns for the noise pulses are generated with respect to the zero transition in order to enable the digital data to be transmitted to be gated out during the occurrence of the noise pulses. This solution is only specific for alternating-voltage power systems and cannot be used with direct-current supplies, on the one hand, and, on the other hand, it cannot be used at all with OFDM since the OFDM bursts mentioned must always have a fixed duration and cannot be interrupted—e.g. at the positions of noise pulses. It is especially in direct-current supplies that, generally due to the generation of the direct voltage by means of rectifiers, in particular, periodic interference signals, i.e. interference signals with precisely predetermined position in time, occur which will be called "interferers" in brief or generally noise pulses in the text which follows.

The periodic noise pulses are caused by the commutation of the current in the rectifier. The power converter components or valves, usually diodes or thyristors, in a rectifier conduct the direct current alternately. When the direct current changes from one valve to another valve, inductances between the valves crate a voltage peak which is associated with voltage rises of the order of magnitude of about 400 kV/s. Since the commutation times are determined by the frequency of the alternating current system, the noise pulses occur in a particular unchanging timing pattern, that is to say periodically.

SUMMARY OF THE INVENTION

It is, therefore, the object of the invention to specify a suitable data transmission method which, in particular, can be used in direct-voltage power supplies, and to create an associated device.

According to an aspect of the invention, a method is provided for transmitting data on at least one electrical power supply line, on which pulse-shaped interference signals with intermediate almost interference-free time intervals occur periodically, using the OFDM (orthogonal frequency division multiplexing) method, wherein the information to be transmitted is distributed over a number of carriers and the composite signal of all modulated carriers is transmitted in the form of an OFDM burst. The OFDM method is designed in such a manner that the OFDM bursts to be transmitted fill up a large proportion of the duration of a period of the pulse-shaped interference signals and between two successive OFDM bursts, a pause of the approximate duration of a noise pulse is maintained. Futhermore, the position of the transmitted OFDM burst is synchronized with the pulse-shaped periodic interference signals due to the fact that the periodic interference signals represent the synchronization pattern, in each case a fixed-length OFDM burst being located between two periodic noise pulses.

According to another aspect of the invention, a device for carrying out the above method includes a transmitter and a receiver, wherein the transmitter and the receiver have processing units for the transmit signals, transmitted in the form of OFDM bursts, with associated coupling units and there are means for synchronizing the transmit signals with the pulse-shaped periodic interference signals.

According to an aspect of the invention, the problem mentioned initially is solved in a simple manner, e.g. by designing the OFDM method in such a manner that the OFDM bursts to be transmitted have a length of about 85% of the distance between two periodic noise pulses. This is possible due to the fact that the defined position of the noise pulses is utilized for synchronizing OFDM transmitter and OFDM receivers. To ensure that the carriers are orthogonal, the frequency difference of two carriers must be in an integral ratio to the reciprocal length of the OFDM burst.

For example, the OFDM bursts will have to have a length of 85% *1.67 ms=1.4 ms in a direct-voltage power supply which is fed by a 12-pulse rectifier. This results in a carrier spacing of about 700 Hz so that, e.g. 32 frequencies are available in a bandwidth of 22 kHz. Thus, 64 bits can be transmitted per OFDM burst with a QPSK (quadrature phase shift key) modulation.

The position of the transmitted OFDM bursts is synchronized with the pulse-shaped periodic interferers in such a manner that an OFDM burst is located precisely between two noise pulses and is thus transmitted within an almost interference-free time interval. The pulse-shaped interferers at the receiver are gated out by a suitable circuit but the OFDM signal located between the interferers can pass unimpededly.

It is suitable to use the first OFDM burst for synchronizing the receiver in that it contains the so-called preamble. After that, so-called training sequences with a defined content are then in each case optionally transmitted in an OFDM burst. This is followed by the OFDM bursts carrying the user information.

The invention can be advantageously used in traffic engineering, particularly in the case of underground rail systems, municipal railroads or streetcars which are operated with direct voltage. In principle, however, the use of the method is not restricted to direct-voltage systems of local traffic systems. The method for reducing interference in the data transmission on power supply systems can be used whenever a power supply system exhibits periodic interference. This generally applies to direct voltage systems and frequently also to alternating-voltage systems.

DETAILED DESCRIPTION OF THE INVENTION

On power supply lines of underground rail systems, it is intended to transmit data in addition to the power supply. The technology, also called power line communication (PLC) modulates the information to be transmitted onto suitable carriers and superimposes the modulation products on the supply voltage of the underground rail system.

Underground rail systems are operated, for example, with a nominal direct voltage of 750 V. It is standard practice to provide the direct voltage by means of 12-pulse rectifiers which, in turn, are fed by a power converter transformer. The 12-pulse rectifiers include two 6-pulse rectifiers which, in turn, are fed by two windings of the power converter transformer which are electrically offset from one another by 300. The power converter transformer is connected on the primary side with the general power supply system with a system frequency of 50 Hz. The method described can also be used at other frequencies such as, e.g. 60 Hz, without restriction.

In general, an underground rail system contains a number of rectifiers which are installed at intervals of approx. 2 km along the rail network. All rectifiers feed the underground rail system jointly and are electrically connected to one another via the power rail of the underground rail system.

Figure 1:
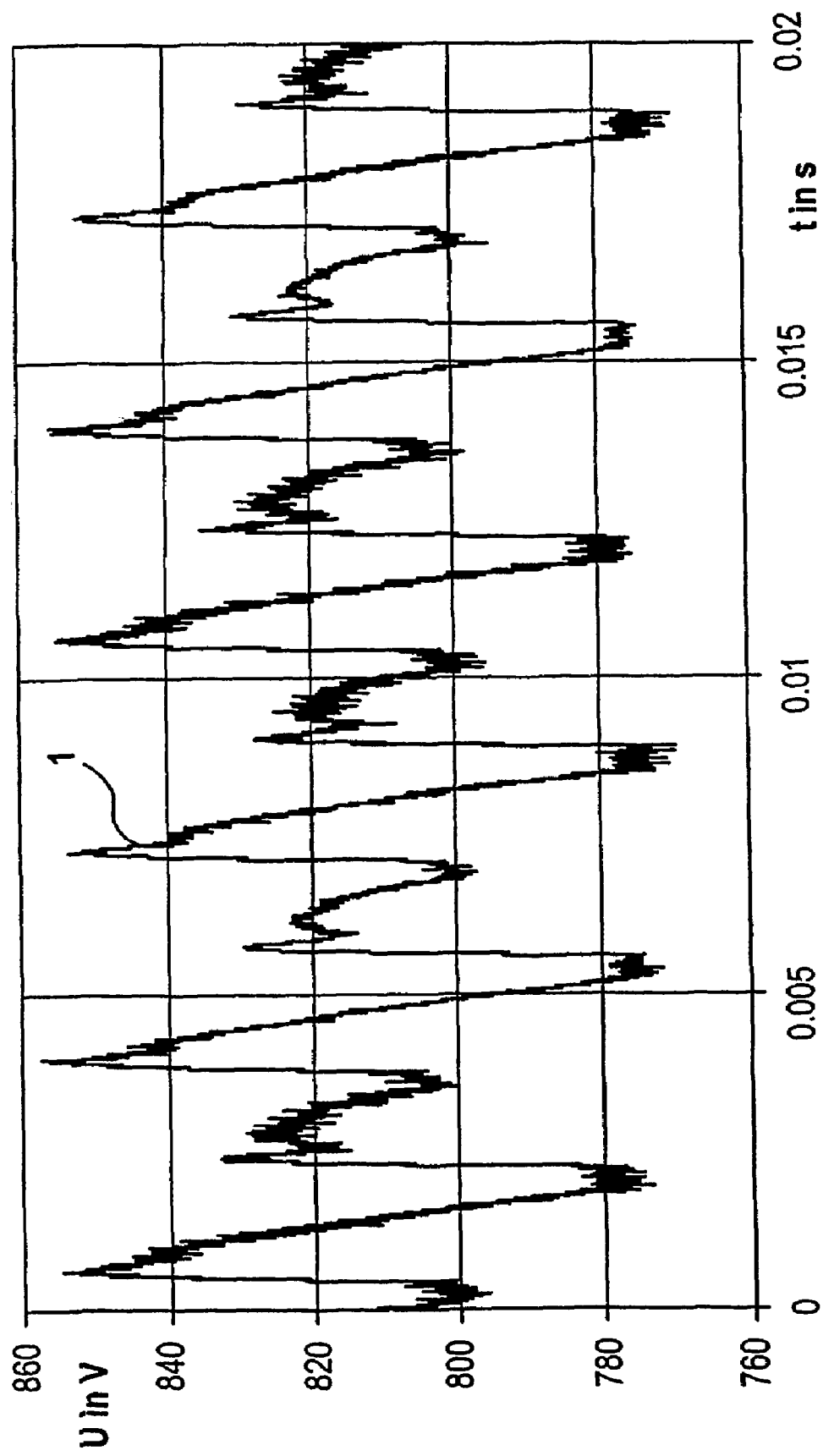
FIG. 1 shows a graphical representation of the variation with time of a direct voltage for an underground rail system.

To further clarify the problem, FIG. 1 shows, by way of example, a measured variation over time of the rail direct voltage over a period of 20 ms. The voltage signal is designated by 1. It can be seen that the direct voltage is not constant but, instead, is subject to fluctuations of up to approx. 80 V.

It is particularly true during the commutation of the currents in the rectifiers that steep-edged voltage jumps with amplitudes of typically 50 V occur at intervals of 20 ms/12=1.67 ms (with a 50 Hz supply). The resultant wide band interference extends up to frequencies of some 100 kHz and is thus within the frequency range of power line communication systems.

FIG. 1 shows that the interference caused by the steep-edged voltage jumps of the rail voltage can only be partially suppressed by filters since a part of the spectral noise energy can always pass through the band-pass. Thus, even elaborate filter circuits only reduce the voltage jumps in the rail voltage to 10% and are thus typically 5 V. Thus, there are always still periodic pulse interferers with considerable amplitude, which are synchronous with the power system, following a filter.

The useful signal of a PLC system which arrives at the receiver is dependent on the transmission characteristics of the link and the distance of the transmitter and is only some 10 mV up to a maximum of 1 V because of the limited permissible transmitting power. The pulse-shaped interference signal is thus always higher than the useful signal which results in a very poor signal-to-noise ratio.

On the one hand, the receiver must be designed for the amplitude of the interference signals because overdriving the receiver causes distortion and thus corruption in the received information. On the other hand, the different levels of interference signal and useful signal make high demands on the dynamic range of the receiver. Thus, a resolution of 9 bits is necessary just for discriminating between a useful signal of 10 mV and a noise signal of 5 V. If the useful signal itself is still to be received with a resolution of 8 bits, the receiver must have a total resolution of 17 bits. This is not possible, or only possible with very high expenditure, with commercially available components and at the required speed.

Furthermore, the use of automatic gain control (AGC), normally used in PLC systems and also necessary, is considerably impeded or becomes impossible due to the interferers.

Figure 2:
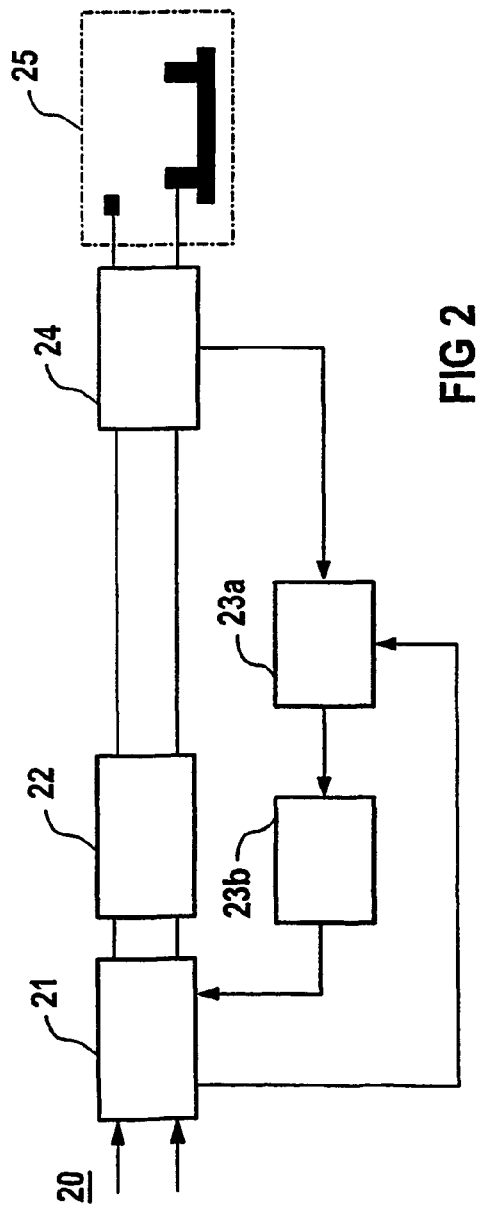
FIG. 2 shows the transmitter section.

FIG. 2 shows a transmitter 20 which includes an OFDM processing unit 21 followed by an amplifier 22. Using a threshold switch, the direct voltage is separated and the noise pulses are detected and supplied as a rectangular reference signal to a phase-locked loop (PLL) which can be of analog or preferably also of digital construction. The phase-locked loop has the task of suppressing high-frequency jitter so that the OFDM processing unit receives a stable synchronization signal in the timing pattern of the noise pulses in order to place data packets precisely between the pulses. After the PLL has locked to the pulse interferer sequence, it is advantageous to deactivate the threshold switch during the emission of the data and to open a suitable time window only at the times at which a noise pulse is expected so that the PLL is not influenced by its own transmit signals which can attain high amplitudes immediately at the transmitter output, and is only fixed to the noise pulse pattern.

This is followed by a coupling unit 24 for coupling to a rail system 25 of an underground rail system. It is also possible to use another power supply system for traffic-engineering facilities.

In the transmitter 20, the data signal is partitioned in such a manner that an individual data burst in each case fits between two noise pulses with a certain safety margin. The data signal is thus always emitted in an interference-free time interval and the precise timing correlation to the noise pulse pattern being established with the combination of threshold switch 33a and subsequent phase-locked loop 33b, described above.

Figure 3:
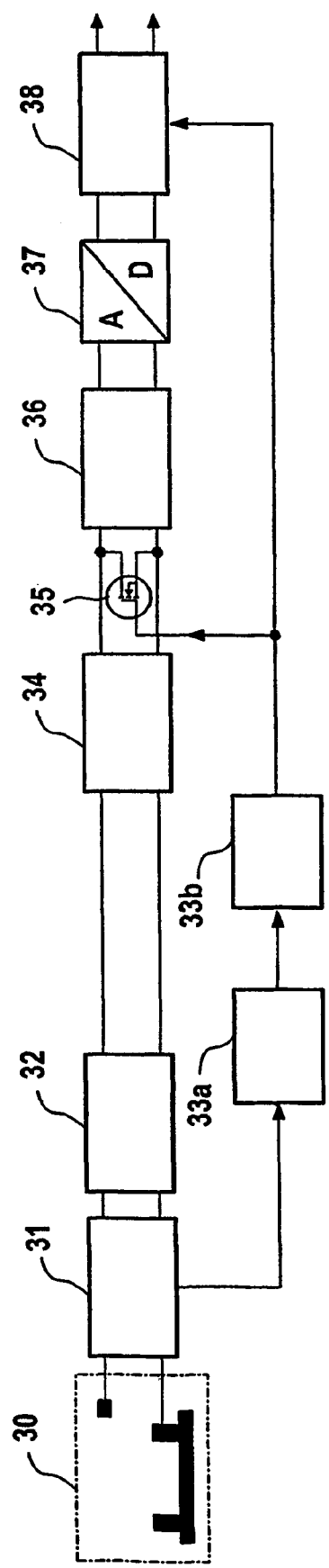
FIG. 3 shows the receiver section of a suitable device for transmitting data with direct-voltage variations according to FIG. 1.

FIG. 3 shows a receiver 30 of a coupling unit 31 for the rail system of FIG. 2, which is followed by a filter 32, an impedance 34 and a short-circuiting device 35.

The short-circuiting device 35 is followed by a unit for automatic gain control (AGC) according to the prior art. The data are fed via an A/D converter 37 to a processing unit 38 for OFDM signals.

Here, too, the noise pulses are detected with the aid of a threshold switch at the power system side and supplied as a rectangular reference signal to a phase-locked loop (PLL) for the purpose of jitter suppression.

The stable synchronization signal from the phase-locked loop in the timing pattern of the noise pulses is then supplied, on the one hand, to the short-circuiting device 35 and, on the other hand, to the processing unit 38 for OFDM signals. The short-circuiting device thus suppresses the received signal for the exact period of a noise pulse and enables the receiver input as soon as the interference-free time interval between the noise pulses begins. Due to the stable synchronization signal, the processing unit 38 for OFDM signals knows the exact position in time of the data packets to be processed so that there can be a correct data recovery.

Instead of the short-circuiting device 35 in the output line of the filter 32 with preceding impedance 34, a switch in the parallel branch can also be used. The impedance 34 is not needed in this case.

After having been decoupled via the impedance 34, the noise pulse is kept away from the OFDM processing unit, e.g. due to the fact that the signal line is short-circuited via an analog switch, e.g. in the form of a transistor. As mentioned, it is also possible to serially mount an electronic switch and to separate the subsequent signal processing from the filter output during the pulse interference.

The signal is supplied to the automatic gain control (AGC) amplifier 36 which amplifies it to a level specified to be optimum for the A/D conversion. The partition signals are then combined in the subsequent processing units and decoded in accordance with the prior art.

The essential factor in the method described above, and the associated device, is that the OFDM method, known per se, is modified by a partitioning of the data, in such a manner that transmission preferably only takes place in almost interference-free time intervals. For this purpose, the transmitting process is synchronized with the periodic pulse interferer and transmission takes place in each case exactly between the noise pulses. Correspondingly, the noise pulses are detected and gated out in the receiver.

After the OFDM signal processing, it is possible to assemble the partitioned data.

The invention was described above especially for data transmission in the case of a direct-voltage supply for underground rail systems. The invention can also be used without other power systems operated with direct voltage, for example with direct-voltage power systems for the independent supply of switchgear systems.

The invention claimed is:

1. A method for transmitting data on at least one electrical power supply line, on which pulse-shaped interference signals with intermediate almost interference-free time intervals occur periodically, using an OFDM (orthogonal frequency division multiplexing) method, wherein information to be transmitted is distributed over a number of carriers and a composite signal of all modulated carriers is transmitted in the form of an OFDM burst, wherein the OFDM method enables the transmitted OFDM to fill up a large proportion of a duration of a period of the pulse-shaped interference signals and between two successive OFDM bursts, a pause of an approximate duration of a noise pulse is maintained, a position of the transmitted OFDM burst is synchronized with the pulse-shaped periodic interference signals because the periodic interference signals represent a synchronization pattern, in each case a fixed-length OFDM burst being located between two periodic noise pulses.

2. The method as claimed in claim 1, wherein the OFDM bursts fill up a length of about 85% of the duration of the period of the pulse-shaped interference signals and maintain a pause of approximately 15% of the duration of the period of the interference signals between two successive OFDM bursts.

3. The method as claimed in claim 1, wherein synchronization between the periodically repeated noise pulses and transmitters and receivers is performed via threshold switches for pulse detection.

4. The method as claimed in claim 3, wherein in the transmitter, after a phase-locked loop has locked to a sequence of pulse interferers, the threshold switch is deactivated during emission of data and a suitable time window is only opened at times at which a noise pulse is expected.

5. The method as claimed in claim 3, wherein an analog or digital phase-locked loop is used for suppressing jitter during the synchronization.

6. The method as claimed in claim 1, wherein the OFDM signal can pass unimpeded through a circuit for gating out noise pulses.

7. The method as claimed in claim 1, wherein an impedance is applied between a coupling unit and a receiver, and the interferers are gated out by short-circuiting a receiving line following an impedance.

8. The method as claimed in claim 1, wherein the noise pulses are gated out by separating a coupling unit from a receiver.

9. The method as claimed in claim 1, wherein the periodically repeated noise pulses are used for coarse synchronization of OFDM transmitters and OFDM receivers.

10. The method as claimed in claim 1, wherein a first OFDM block is used for fine synchronization of a receiver and that, following the fine synchronization, training sequences are transmitted and are followed by the OFDM bursts carrying useful information.

11. A device for carrying out the method as claimed in claim 1, comprising:
a transmitter and a receiver, wherein the transmitter and the receiver have processing units for transmitting signals in the form of OFDM bursts, with associated coupling units; and
a unit for synchronizing the transmitted signals with the pulse-shaped periodic interference signals.

12. The device as claimed in claim 11, wherein the synchronizing unit includes threshold switches followed by a phase-locked loop in the transmitter and in the receiver, the threshold switch in the transmitter, after the phase-locked loop has locked, only being active in time intervals in which a noise pulse is expected.

13. The device as claimed in claim 11, wherein, in the transmitter, an amplifier follows the processing unit for the OFDM signal.

14. The device as claimed in claim 11, wherein the receiver has a processing unit for the OFDM signal and a coupling unit.

15. The device as claimed in claim 14, wherein the coupling unit is followed by a filter, an impedance and a short-circuiting device.

16. The device as claimed in claim 14, wherein the coupling unit is followed by a filter and a switch in a longitudinal branch without impedance.

* * * * *